Patented Apr. 15, 1941

2,238,640

UNITED STATES PATENT OFFICE 2,238,640

POLYMERIC MATERIAL

William E. Hanford, Wilmington, Del., assignor to E. I. du Pont de Nemours & Company, Wilmington, Del., a corporation of Delaware No Drawing. Application April 28, 1939, Serial No. 270,660

8 Claims. (Cl. 260—45)

This invention relates to polymeric materials and more particularly to synthetic resins.

This invention has as an object the preparation of new and useful resinous materials. A further object is to prepare products useful in the molding, coating, sizing, adhesive, impregnating, and related arts. Other objects will appear hereinafter.

The above objects are accomplished by reacting a polyamide-forming composition and 3 to 67% molar per cent, based on the polyamide-forming composition, of a polyamide-forming reactant of the class consisting of diamines and dibasic carboxylic acids in the presence of a phenol containing an amide-forming group complementary to that of the polyamide-forming reactant, said phenol being used in amount substantially chemically equivalent to said polyamide-forming reactant, continuing the reaction until the phenol is practically all combined, and then reacting this intermediate product with formaldehyde. The phenol, for instance, may be salicylic acid, in which case a diamine is used as the polyamide-forming reactant. Or if the formaldehyde reactive phenol is a monoamino phenol a dibasic carboxylic acid is used as the polyamide-forming reactant.

The "polyamide-forming composition" may consist of a polymerizable monoaminomonocarboxylic acid or an amide-forming derivative thereof, or of an equimolecular mixture of diamine and dibasic carboxylic acid or amide-forming derivatives thereof. In the preferred embodiment of this invention the polyamide-forming composition consists of a diamine-dibasic carboxylic acid mixture and in this case the "polyamide-forming reactant" will constitute an excess of one of the ingredients of the polyamide-forming composition. Throughout the description and claims the terms "amino-acid", "diamine", and "dibasic carboxylic acid" will be used as including also their amide-forming derivatives.

The simple polyamide chains, obtained in accordance with the process of this invention by reacting a diamine and dibasic carboxylic acid with one reactant in excess in the presence of a phenol containing an amide-forming group complementary to that of the reactant used in excess, is terminated by phenolic groups and can therefore be linked together by treatment with formaldehyde. The products thus obtained are phenol-formaldehyde modified polyamides in which the amide groups exceed the number of phenolic oxygens. They consist essentially of polyamide units linked together through the methylene groups of the phenol-formaldehyde linkages. The products of this invention are distinguished both chemically and physically from the amide modified phenol-formaldehyde resins obtained by reacting, prior to reaction with the formaldehyde, but one member of the polyamide-forming composition (the diamine or dibasic acid) with a phenol containing the complementary acid or amino group. The products of this invention are distinguished in that the number of amide groups exceeds the number of phenolic hydrogens and in that the products are tougher.

In carrying out my invention, the polyamide-forming composition comprising the diamine and dibasic carboxylic acid with one ingredient in excess is heated with either the phenolic acid or with the phenolic amine depending upon which polyamide-forming ingredient is used in excess. It is usually preferred to use the polyamide-forming composition in the form of the diamine-dibasic acid salt, which necessarily contains the polyamide-forming reactants in equimolecular proportions, and add the desired excess of diamine or dibasic carboxylic acid. The heating is continued until a polyamide is formed having phenolic end groups. This product is usually a white, opaque, brittle solid, whose melting point and exact physical properties depend largely upon the proportions of the ingredients from which it is made. The resulting polyamide is then ground to a powder and intimately mixed with formaldehyde, hexamethylenetetramine or other formaldehyde liberating material, and heated to a temperature high enough to complete the amidation reaction, i. e. above 150° C. and preferably above 180° C.

The following examples, in which parts are by weight, illustrate the preparation and application of the products of this invention.

Example I

An intimate mixture of 82 parts of decamethylene diammonium sebacate, 79 parts of hexamethylene diammonium adipate, 12 parts of hexamethylenediamine, and 28 parts of salicyclic acid was heated at 250° C. for 2 hours in an evacuated vessel which had been carefully flushed out with deoxidized nitrogen to remove all oxygen. The product was a hard, friable, white solid which was carefully ground to a powder and mixed with 2 parts of hexamethylenetetramine. The resulting mixture was heated at 180° C. under nitrogen for 3 hours, followed by 0.5 hour at 180° C. in a vacuum of 2 mm. pressure of mercury. The product was a hard, opaque, fairly tough solid of light yellow color. It was soluble in formic acid and slightly soluble in butanol, but insoluble in acetone, toluene and butyl acetate; it had a softening point between 230° and 240° C. This material could be mixed with further hexamethylenetetramine and molded to give an insoluble and infusible molded article.

Example II

An intimate mixture of 82 parts of decamethylene diammonium sebacate, 79 parts of hexamethylene diammonium adipate, 12 parts of hexamethylenediamine, and 36 parts of gamma-p-hydroxyphenylbutyric acid was heated at 240° C. for three hours in an evacuated vessel which was flushed out with deoxidized nitrogen to insure the absence of oxygen. The product was then ground to a fine powder and thoroughly mixed with 2 parts of hexamethylenetetramine. The mixture was heated at 180° C. for three hours under nitrogen, followed by fifteen minutes in a vacuum of 2 mm. The product was a hard, light brown solid, soluble in formic acid but insoluble in alcohol. It had a softening range of 170°–175° C.

Example III

A mixture of 82 parts of decamethylene diammonium sebacate, 79 parts of hexamethylene diammonium adipate, 6 parts of hexamethylenediamine, and 14 parts of p-hydroxybenzoic acid was heated at 250° C. for four hours in an evacuated vessel from which the oxygen had been removed by flushing with deoxidized nitrogen. The product was ground to a fine powder and mixed with 5 parts of hexamethylenetetramine. The mixture was heated at 180° C. for five hours. The product was a hard, translucent, tough solid of a light yellow color; it was soluble in formamide and had a softening range of 164°–167° C.

Example IV

A mixture of 79 parts of hexamethylene diammonium adipate, 112 parts of decamethylene diammonium sebacate, 12 parts of hexamethylenediamine, and 30 parts of 4-hydroxy-3-methylbenzoic acid was heated for three hours under oxygen-free conditions. The product was ground to a fine powder and intimately mixed with 5 parts of hexamethylenetetramine and the mixture heated at 180° C. for five hours under a stream of deoxidized nitrogen. The product was a hard, tough, translucent solid of yellow color. It was soluble in formic acid but insoluble in alcohol, butyl acetate and toluene. It had a softening point of about 155° C. This product was readily moldable to a film which was clear and transparent, tough and flexible. When treated with additional hexamethylenetetramine, it would not give an infusible product.

Example V

A mixture of 130 parts of hexamethylene diammonium adipate, 6 parts of hexamethylenediamine, and 14 parts of salicylic acid was heated at 220° C. for two hours in a vessel from which the oxygen had been removed by flushing with deoxidized nitrogen. The product was ground to a powder and mixed with 1 part of hexamethylenetetramine. The resulting mixture was then heated at 275° C. under a stream of deoxidized nitrogen for three hours. The product was a hard, opaque, brittle solid of light brown color. It had a softening range of 230°–235° C. The product absorbed only 1.6% and 6.2% of its weight of water at 50% and 100% relative humidity, respectively, as compared to 2.6% and 7.6% for unmodified polyhexamethylene adipamide.

Example VI

An intimate mixture of 93.6 parts of decamethylene diammonium sebacate, 10.1 parts of sebacic acid, and 10.9 parts of p-aminophenol was heated at 200° C. for three hours under oxygen-free conditions. The product was ground to a fine powder and intimately mixed with 2 parts of hexamethylene tetramine. This mixture was then heated at 218° C. for an hour and a half under a stream of deoxidized nitrogen. The product was a hard, opaque, dark brown solid having a softening range from 150° to 155° C. This product could in turn be ground to a powder, mixed with further hexamethylene tetramine, and molded to an infusible product.

As indicated by the foregoing examples, a wide selection of reactants and reaction conditions may be used in the preparation of the products of this invention. As polyamide-forming composition may be used any polymerizable aminoacid or any combination of diamine and dibasic carboxylic acid. Typical examples of such compositions are given in U. S. Patents 2,071,253, 2,130,523 and 2,130,948. Other phenolic acids or amines than those used in the foregoing examples may be used, typical examples being 3-hydroxybenzoic acid, 4-hydroxybenzoic acid, 2-hydroxy-3-methylbenzoic acid, 4-hydroxy-3-methylbenzoic acid, 2-hydroxy-4-methylbenzoic acid, 4-hydroxy-3-methylphenylacetic acid, 4-hydroxyphenylacetic acid, 3,5-dihydroxybenzoic acid, 4-amino-2-methylphenol, 2-amino-4-methylphenol, and gamma-(4-hydroxy-3-methylphenyl)butylamine. It is preferable to use a diamine as the polyamide-forming reactant (excess in case of diamine-dibasic acid composition) and a phenol acid as the phenolic constituent since this gives lighter colored products than are obtained with the use of a dibasic carboxylic acid as polyamide-forming reactant and an aminophenol. Formaldehyde generating reactants which may be used include, in addition to hexamethylenetetramine, such materials as paraformaldehyde, trioxymethylene, and methylal.

Heating cycles are not limited to those given in the examples but may vary over a wide range, e. g. at temperatures ranging from 150° to 300° C. and times ranging from 0.5 to 15 hours, depending upon the polyamide-forming ingredients used. The relative amounts of ingredients are not limited to those given in the examples; from 3 to 67% molar excess of either the diamine or dibasic carboxylic acid constituent may be used, the preferred range being from 5 to 20% molar excess.

By means of this invention it is possible to prepare modified polyamide resins of widely different properties which may be heat hardenable if the proper selection of ingredients is made. In order to obtain heat hardenable products it is necessary to use carboxylic or amino substituted phenol which has two or more reactive hydrogen atoms, i. e. a phenol which has two or more unsubstituted ortho or para positions to the phenolic hydroxyl group. In order to obtain a non-heat hardenable product it is necessary to use a carboxylic or amino substituted phenol which has only one reactive hydrogen, i. e. a phenol having only one unsubstituted ortho or para position to the phenolic hydroxyl group. Furthermore, there should be at least one reactive hydrogen atom on the phenolic constituent in order to secure the desired reaction in the heating time used in the foregoing examples. If there is no reactive hydrogen, a much longer heating cycle must be used.

The products of this invention, depending upon their properties, are useful in the plastic, molding, sizing, impregnating, coating and related arts. In their various applications the products may be mixed with one another or with other agents such as plasticizers, resins, cellulose derivatives, pigments, fillers, dyes, and the like.

The modified polyamides prepared by the process of this invention are superior to the unmodified polyamides for many purposes because they may be prepared as transparent plastic solids with a high gloss. The products are more readily moldable than the unmodified polyamides and may be made heat hardenable. Furthermore, by using smaller amounts of formaldehyde or formaldehyde-liberating substance than those necessary to react with the phenolic groups, it is possible to obtain friable materials which are readily ground to a powder suitable as molding powders.

As many apparently widely different embodiments of this invention may be made without departing from the spirit and scope thereof, it is to be understood that I do not limit myself to the specific embodiments thereof except as defined in the appended claims.

I claim:

1. The resinous reaction product of formaldehyde and the product obtained by reacting a polyamide-forming composition and an excess of polyamide-forming reactant of the class consisting of a diamine and a dibasic carboxylic acid in the presence of a phenol containing a carbonamide-forming group complementary to the amide-forming group contained in said polyamide-forming reactant, said polyamide-forming composition comprising reacting material selected from the class consisting of monoaminomonocarboxylic acids and mixtures of diamine with dibasic carboxylic acid.

2. The resinous reaction product of formaldehyde and the product obtained by reacting polyamide-forming ingredients comprising a diamine and a dibasic carboxylic acid with one of said ingredients in substantial excess in the presence of a phenol containing a carbonamide-forming group complementary to that of the mentioned ingredient present in excess.

3. The resinous reaction product of formaldehyde and the product obtained by reacting a diamine in which the amino groups contain at least one hydrogen atom, a dibasic carboxylic acid in amount of about 3% to 67% molar excess of said diamine, and a monoaminophenol in which the amino group contains at least one hydrogen atom.

4. The resinous reaction product of formaldehyde, a dibasic carboxylic acid, a diamine in amount of 3% to 67% molar excess of said dibasic carboxylic acid, and a phenolic monocarboxylic acid, the amino groups in said diamine containing at least one hydrogen atom.

5. A process which comprises heating to reaction temperature polyamide-forming ingredients comprising a diamine and a dibasic carboxylic acid with one of said ingredients in substantial excess in the presence of a phenol containing a carbonamide-forming group complementary to that of the mentioned ingredients in excess, and reacting the phenol modified polyamide thus obtained with a substance of the class consisting of formaldehyde and formaldehyde-liberating materials.

6. A process which comprises heating to reaction temperature a diamine in which the amino groups contain at least one hydrogen atom, a dibasic carboxylic acid in amount of about 3% to 67% molar excess of said diamine, and a monoaminophenol in which the amino group contains at least one hydrogen atom, and heating to reaction temperature the phenol modified polyamide thus obtained with a substance of the class consisting of formaldehyde and formaldehyde-liberating substances.

7. A process which comprises heating to reaction temperature a dibasic carboxylic acid, a diamine in amount of about 3% to 67% molar excess of said dibasic carboxylic acid, and a phenolic monocarboxylic acid, and heating to reaction temperature the phenol modified polyamide thus obtained with a substance of the class consisting of formaldehyde and formaldehyde-liberating substances, said diamine being one in which the amino groups contain at least one hydrogen atom.

8. A process for making resinous material which comprises heating a polyamide-forming composition and an excess of polyamide-forming reactant of the class consisting of a diamine and a dibasic carboxylic acid in the presence of a phenol containing a carbonamide-forming group complementary to the amide-forming group contained in said polyamide-forming reactant, and reacting the phenol modified polyamide thus obtained with a substance of the class consisting of formaldehyde and formaldehyde-liberating materials, said polyamide-forming composition comprising reacting material selected from the class consisting of monoaminomonocarboxylic acids and mixtures of diamine with dibasic carboxylic acid.

WILLIAM E. HANFORD.